Aug. 25, 1953  T. J. RHODES ET AL  2,649,618
METHOD AND APPARATUS FOR EXTRUSION
OF PLASTICS HAVING ELASTIC MEMORY
Filed June 29, 1950  2 Sheets-Sheet 1
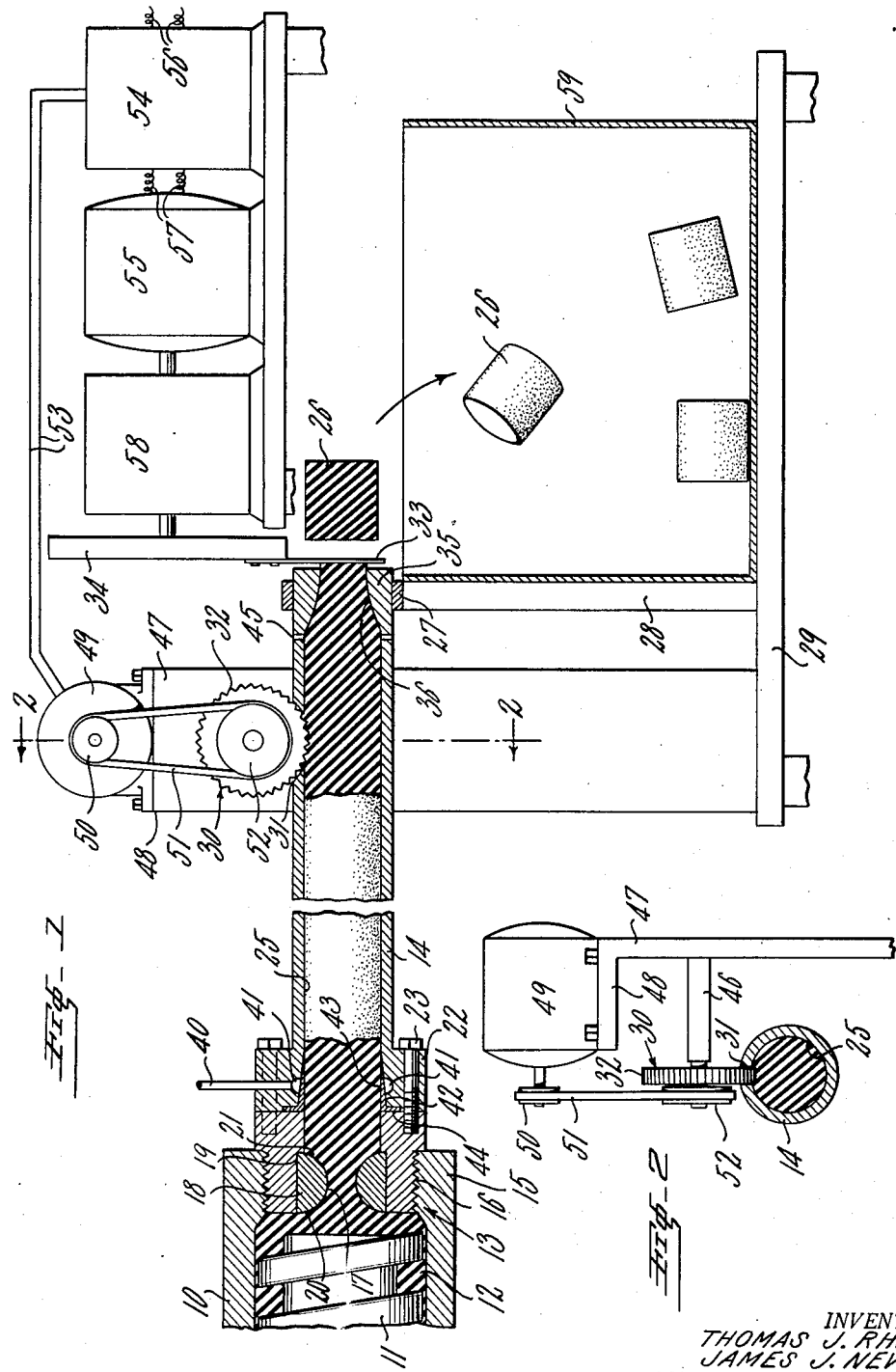
INVENTORS
THOMAS J. RHODES
JAMES J. NEVILLE
BY
James J. Long
AGENT

230 VOLT D.C. LINE

INVENTOR.
THOMAS J. RHODES
JAMES J. NEVILLE
BY James J. Long
AGENT

Patented Aug. 25, 1953

2,649,618

UNITED STATES PATENT OFFICE 2,649,618

METHOD AND APPARATUS FOR EXTRUSION OF PLASTICS HAVING ELASTIC MEMORY

Thomas J. Rhodes, Clifton, and James J. Neville, Maywood, N. J., assignors to United States Rubber Company, New York, N. Y., a corporation of New Jersey Application June 29, 1950, Serial No. 171,122

8 Claims. (Cl. 18—12)

1

This invention relates to a method and apparatus for extrusion of plastic materials having elastic memory, and more particularly it relates to the production of plastic products having more exact volume or weight than has heretofore been possible, by an improved extrusion method involving the step of measuring a definite length of the plastic material being extruded while the material is confined in a definite cross-sectional area.

It has previously been known to produce definite lengths of extruded plastic materials by passing the extruded plastic before a cutting mechanism that is synchronized with the rate of advancement of the plastic so that equal lengths of plastic are cut off regardless of variations in the rate of extrusion. Such methods have proven satisfactory for obtaining products of uniform length, volume and weight with relatively "dead" or inelastic plastics, such as clay products, which have little or no elastic memory, and therefore do not tend to change shape appreciably after emerging from the extrusion die.

However, when such conventional methods are employed with plastic materials having great elastic memory, such as raw vulcanizable rubber stock, in an attempt to obtain shaped forms of definite volume or weight, the results obtained are unsatisfactory. The reason for this is that such elastic materials, upon emerging from the extrusion die, swell radially to a greater cross-sectional size than the size of the die orifice. This swelling is dependent on such variables as the viscosity of the stock fed to the extruder, the temperature of the extruder, etc. In practice, the swelling is therefore not a constant value, but varies over a considerable range from time to time during the extrusion operation, due to the normal unavoidable variations in the character of the plastic stock and the conditions of extrusion. For this reason, the cross-sectional size of the extruded product is variable, and equal lengths of such products do not have equal volumes nor equal weights.

For example, when extruding a conventional rubber golf ball center stock to obtain "preforms" for molding, that is, shaped pieces of definite volume or weight, it is observed that the weight of equal lengths of the extruded product may vary by an average value of greater than plus or minus 10%. This means that some of the equal lengths may contain insufficient material to fill the golf ball center molds properly, so that a defective center is produced, and others of the equal lengths may contain too much

2 material, so that excessive "flash" overflows from the molds and is wasted.

The principal object of the present invention is to provide an improved extrusion method and apparatus in which the foregoing variations in the volume or weight of the extruded products are minimized, with consequent savings in material and improvements in the quality of the product.

According to the present invention the extrusion or tube is provided with a measuring or metering element responsive to the flow of a definite length of the plastic while confined in a definite cross-sectional area within the die or tube. Such metering element is used to synchronize or control a cutting mechanism located outside of the die, so that the cutting mechanism operates to sever the extruded plastic stream after a definite amount of linear flow has occurred within the die. Hence, the cutting mechanism cuts at controlled intervals corresponding to a definite linear flow of plastic measured while the plastic is confined in a definite cross-sectional area (determined by the cross-sectional area of the die). Therefore the plastic is necessarily cut off in lengths of precisely the same volume or weight.

The invention will be more fully understood from the following detailed description when read with reference to the accompanying drawing, in which:

Fig. 1 is a side elevational view, partly in section, of an apparatus constructed according to the present invention;

Fig. 2 is a view of the apparatus substantially along the lines 2—2 of Fig. 1;

Figure 3:
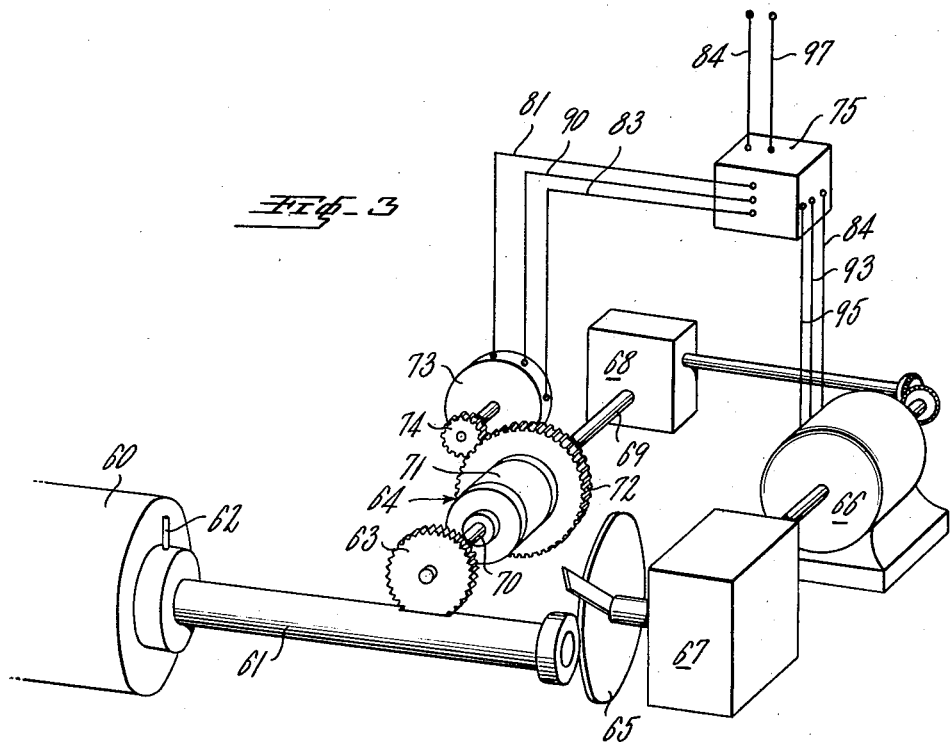
Fig. 3 is a schematic perspective view of a modification of the invention.

Referring to Fig. 1, the apparatus shown comprises a conventional extruder 10, having a rotating feeding screw 11 for advancing plastic stock, such as raw vulcanizable rubber stock 12, through the apparatus under pressure. The screw 11 may be rotated by a suitable driving means (not shown) in the conventional manner, and the plastic stock may be fed into the extruder 10 through the usual hopper (not shown) at the entrance end thereof.

The plastic stock 12 is first advanced through a preliminary die assembly 13 and thereafter through an elongated lubricated die or confining tube assembly 14 of the character disclosed in copending application of Thomas J. Rhodes and James J. Neville, Serial No. 164,282, filed May 28, 1950. The preliminary die assembly 13 is detachably mounted at the delivery head 15 of the extruder 10, as by a screw thread 16 on the outside of the die assembly. The die assembly has therein a throat, or central restricted die passage 17, of small diameter. The die passage 17 is defined by an annular member 18 disposed within a recess 19 in the entrance to the die assembly 13. In order to enable smooth, stream-line flow of the stock 12 into and out of the die passage 17, the annular restricting member 18 is smoothly curved into and out of the orifice 17, as indicated at 20 and 21.

As is conventional practice, means (not shown) may be provided for heating the extruder 10 and the die assembly 13 to facilitate the extrusion.

The confining tube 14 has an enlarged flange portion 22 at its entrance end, through which bolts 23 pass into the body of the die assembly 13 for detachably securing the tube assembly to the die assembly. The tube 14 has an elongated passageway 25 therein, having the cross-sectional size and shape of the desired preforms. As shown the preforms are cylindrical raw rubber pieces 26. The exit end of the tube 14 is fastened by means of a clamp 27 to a standard 28 extending from a suitable supporting framework 29.

As is disclosed in the copending application referred to previously, it is desirable that the diameter of the passage 25 be greater than the diameter to which the stock 12 would ordinarily swell upon emerging freely from the restricted passage 17. With the usual vulcanizable soft rubber stock, the cross-sectional area of the passage 25 should be from three to six times, but preferably from four to five times, that of the die passage 17.

The forward movement of the plastic rubber stock 12 causes rotation of a measuring wheel 30 which extends through a closely fitting and suitably shaped slot 31 in the wall of the tube 14. The outer rim of the wheel 30 preferably has teeth 32 for more positively engaging the rubber stock. As will be explained in detail below, the rate of forward movement of the stock, as measured by the wheel 30, is used to control the speed of operation of a cutting knife 33 carried by a rotating fly-wheel 34 located at the exit end of the tube 14.

In order to minimize radial swelling and axial shrinkage of the extruded product, the passage 25 is preferably made sufficiently long so that the stock is confined therein in the desired shape for at least 3 seconds, and preferably 15 to 20 seconds.

The stock is caused to fill out the tube 14 in a firmly compacted condition by a snubber 35 at the exit end of the tube 14, which permits the extruder screw 11 to develop substantial pressure within the tube. The snubber 35 has a restricted passageway 36, the entrance to which is smoothly tapered in order that the shaped plastic stock may pass smoothly therethrough without turbulent flow or disruption. For soft rubber stocks, the exit passage 36 should have a diameter equal to from 50 to 95%, preferably about nine-tenths of the diameter of passage 25.

In order that the rate of advancement of the rubber stock adjacent to the wall of the tube 14, as measured by the wheel 30, shall be substantially the same as the rate of advancement of the rubber stock in the center of the passage 25, means is provided for introducing a thin continuous film of liquid lubricant between the surface of the stock and the walls of the passage 25. The lubricant prevents frictional engagement of the stock with the walls of the passage, thereby preventing disrupting strains and turbulence in the advancing rubber. Such lubricating means is located at the entrance end of the confining tube assembly 14 and includes a lubricant inlet tube 40 passing through the flange 22 to an annular distributing passageway 41 located in the wall of a suitable recess 42 at the entrance of the tube 14. The recess 42 is so shaped as to accommodate a thin annular lubricant applicator member 43, which is brazed to and held in place by a retaining ring 44 located between the face of the die assembly 13 and the confining tube 14. A small amount of liquid lubricant introduced at a constant rate from a suitable positive pumping system (not shown) through the delivery tube 40, passes out under the forward edge of the applicator member 43 onto the surface of the passing rubber column. The member 43 keeps the rubber stock from entering the lubricant distributing passage 41.

Suitable lubricants for this purpose are liquids which reduce the surface tackiness of the plastic, and which are not deleterious to the plastic being extruded.

Among such lubricants are soaps, glycerine, paraffin oil, and silicone mold release fluid, which is a mixture of low molecular weight linear polymeric organo-siloxanes.

It is necessary to provide means for the lubricant to escape from the tube 14 before the plastic stock passes through the restricting passage 36 at the end of the tube, so that there will not be an accumulation of lubricant at this point which would result in distortion of the stock within the passage 25. For this purpose, a series of small radial lubricant bleed holes 45 is provided in the wall of the tube 14, just before the snubbing portion 35.

The measuring wheel 30 is mounted for rotation on a horizontally extending spindle 46 held in a vertical standard 47, which is secured at its base to the framework 29. A horizontally extending platform 48 on top of the standard 47 supports an alternator 49 having a driving pulley 50 connected by means of a belt 51 to another driving pulley 52 rotatable with the wheel 30. The alternator 49 is electrically connected by means of conductors 53 to an amplifier 54 which feeds the amplified alternating voltage generated by the alternator 49 to a synchronous motor 55. By this arrangement, the speed of the synchronous motor 55 is proportioned to the frequency of the alternating voltage, and hence the motor 55 is driven at a speed proportional to the speed of rotation of the measuring wheel 30. Power supply wires 56 connect the amplifier to a power source in the conventional manner, while the amplifier is connected to the motor 55 by conductors 57.

For the purpose of driving the fly-wheel 34 carrying the cutting knife 33 at the desired speed, a variable speed transmission 58 is interposed between the motor 55 and the fly-wheel 34. The transmission may be set manually at the desired speed.

In operation, the extruder screw 11 forces the plastic stock 12 through the restricted die passage 17 into the elongated confining passage 25 in which the stock is confined under pressure and compacted in the desired shape. A thin film of lubricant is continuously applied to the surface of the advancing stock through the inlet tube 40 as the stock passes into the passage 25. The advancing stock 12 causes the measuring wheel 30 to revolve, thereby driving the alternator 49. The speed at which the alternator is driven, and hence the frequency of the electrical signal generated thereby, determines the speed of the synchronous driving motor 55, thereby fixing the speed of rotation of the fly-wheel 34 carrying the cutting knife 33 at a rate directly proportional to the linear speed of the rubber column.

The cutting knife 33 cuts the plastic stock 12 into lengths 26 as it emerges from the exit end of the tube 14. The lubricated stock is momentarily reduced in diameter while passing through the restricted snubbing passage 36, and recovers after emerging to substantially the size and shape imparted to it within the tube 14. The cylindrical preforms 26 cut off by the rotating knife 33 may be collected in a suitable container 59, wherein they may be dusted with talc to prevent sticking together.

Those skilled in the art will realize that many different control mechanisms may be employed for controlling the operation of the cutting mechanism in response to the rate of flow of the plastic within the confining die or tube. Fig. 3 shows a preferred modification of the invention in which plastic stock is extruded from a conventional extruder 60 through an elongated die or confining tube 61 having a lubricant inlet 62 for lubricating the plastic in the manner previously described. In this case, the tube 61 is again provided with a measuring wheel 63 in association with a suitable controlling system including a mechanical differential 64 for synchronizing the speed of a fly cutter 65 for cutting the extruded plastic as it emerges from the exit of the tube 61. The fly cutter 65 is driven by a direct current motor 66 through a variable speed transmission 67 suitably coupled thereto. The motor 66 is also suitably coupled, through a variable speed transmission 68, to a shaft 69 extending from the mechanical differential 64. The variable speed transmissions may be set manually to give a desired ratio between the speed of the cutter 65 and the shaft 69. Another shaft 70 extends from the opposite end of the mechanical differential 64 and is suitably coupled to the metering wheel 63.

The mechanical differential 64 is of the spur gear type and is a conventional gear arrangement so constructed that when the two shafts 69 and 70 extending therefrom are driven at the same speed in opposite directions, the housing 71 of the differential remains stationary. However, if there is any difference in the speed at which the shafts 69 and 70 are driven, then the housing 71 will rotate in the same direction as the faster of the two shafts at a speed equal to one-half the difference in the speed of the two shafts.

The rotation of the housing 71 of the mechanical differential 64 is utilized to control the speed of the driving motor 66 in response to changes in speed of the measuring wheel 63, so that these two speeds always remain in the same ratio. For this purpose, a circumferential ring gear 72 fixed to the housing 71 of the differential 64 is suitably coupled to a conventional potentiometer 73 through a pinion gear 74 on the shaft of the potentiometer. When the measuring wheel 63 is rotated at a faster or slower speed than the shaft 69 by the movement of the plastic within the tube 61, the mechanical differential housing 71 and gear 72 turn in a clockwise or counter-clockwise direction to make a corresponding adjustment in the potentiometer 73. The potentiometer 73 is electrically connected to a vacuum tube controller 75 of conventional construction which is in turn electrically connected to the compound direct current driving motor 66 so as to control the shunt field current thereof, thereby controlling the speed of the motor. When the speed of the motor 66 is thus corrected to its proper relation with the speed of the measuring wheel 63, then the shafts 69 and 70 revolve at the same speed and the mechanical differential housing 71 remains stationary. Any increase or decrease in the speed of the wheel 63 caused by a change in the speed of advancement of the plastic, causes a corresponding rotation of the housing 71 of the mechanical differential, with consequent adjustment of the potentiometer and correction of the speed of the motor 66. In this manner, the operation of the fly cutter 65 is synchronized with the speed of advancement of the plastic within the tube 61.

Figure 4:
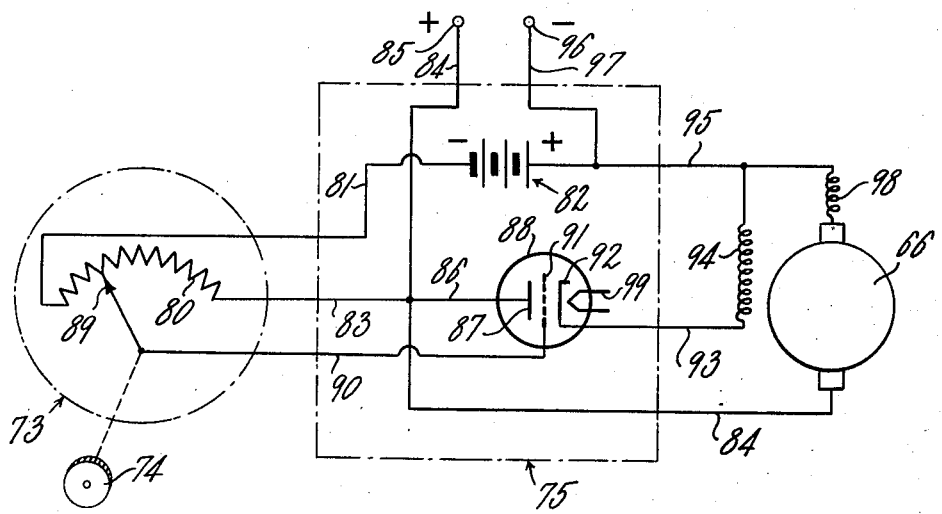
Fig. 4 is a wiring diagram of the control system employed in Fig. 3.

Fig. 4 shows the general arrangement of the electrical connections between the direct current power supply, the controller 75, the variable potentiometer 73, and the compound direct current motor 66. The variable potentiometer 73 includes a resistance element 80, one end of which is connected by means of a conductor 81 to the negative terminal of a battery 82 which supplies a bias voltage, while the other end of the resistance element 80 is connected by means of a conductor 83 to a conductor 84 leading to the positive terminal 85 of the main power supply. The positive power supply line 84 is also connected by means of a conductor 86 to the plate 87 of a triode vacuum tube 88 within the controller 75. The variable contact 89 of the potentiometer 73, actuated through pinion gear 74 by the movement of the mechanical differential 64 (Fig. 3), is electrically connected by means of a conductor 90 to the grid 91 of the triode 88. The cathode 92 of the triode is electrically connected by means of a conductor 93 to one end of the shunt field 94 of the motor 66. The other end of the shunt field is electrically connected by a conductor 95 to the positive terminal of the bias supply 82 and also to the negative terminal 96 of the direct current main power supply by means of a conductor 97. The negative terminal 96 of the main power supply is also connected by conductors 97 and 95 to the series field 98 of the motor 66. The positive conductor 84 of the main power supply is connected to one brush of the motor 66.

This arrangement is such that the current flowing through the shunt field 94 of the motor 66 will vary with the position of the variable contact 89 of the potentiometer 73, since the position of the contact, by controlling the relative potential applied to the grid of the triode, also determines the amount of current flowing through the triode and the shunt field 94. The effect of the bias supply 82 is to produce a greater change in the current flowing through the triode for a given change in position of the variable contact 89 of the potentiometer 73.

It will be understood that the cathode 92 of the triode is heated to operating temperature by the usual filament supply source (not shown) acting on the filament 99.

When the preforms produced in the foregoing apparatus are weighed it is found that they are remarkably uniform as to weight. For example, in one actual case of extruding golf ball center preforms from relatively soft vulcanizable rubber stock, it was found that all of the preforms were within plus or minus 3% of the average weight. It is believed that such uniformity in the weight of extruded preforms has not been obtainable previously except by laborious trial and error hand cutting and weighing methods.

The reason for the uniformity of the preforms obtained by the present method and apparatus is that the measuring element, such as the wheel 30, which controls the cutting knife, is responsive to the linear speed of the plastic while confined within a die or tube of definite, constant cross-sectional area. Since the rate of linear flow through an area of constant cross-section controls the cut, the volume or weight of the cut piece is necessarily constant, independently of any swelling or shrinkage which may take place after the plastic emerges from confinement. This is in contrast to conventional methods involving measuring the rate of advancement of plastic after its emergence from the die and using this measurement to cut off constant lengths of the advancing product. Such constant lengths are frequently found to vary considerably in volume or weight because of uncontrollable variation in the cross-sectional area of elastoplastic material extruded from a conventional die.

We have illustrated as a preferred form of our invention an apparatus including a restricted entrance die, a lubricated confining tube of considerable length, and a snubbing exit passage, all preferably proportioned as disclosed. The purpose of this combination, as is explained in the copending application referred to previously, is to minimize radial swelling and axial shrinkage of the extruded product. In this way, we can obtain preforms which not only have substantially constant volume and weight, but which also have essentially unvarying cross-sectional area and length. This is of particular importance in the case of such articles as extruded tire tread preforms, which should not only contain the desired weight or volume of rubber, but which should have a certain definite and unvarying profile and length.

However, we may carry out our invention without using the combination of restricting die, elongated tube, and snubber. Instead, we may simply use a relatively short die, the speed measuring element being responsive to the rate of flow within the die passage, so that the stock is confined in a definite cross-sectional area while the speed thereof is being determined. The plastic stock, upon emerging from such a relatively short die, will tend to swell radially and shrink axially to an appreciable extent. In such cases, the length and cross-sectional area of the products cut off by the cutter controlled in the manner of this invention may vary considerably, but the volume or weight of the product will still be substantially constant.

When employing a relatively short die or tube in place of the elongated tube 14, we may sometimes dispense with the liquid lubricant applicator means, and use instead a self-lubricating die, such as one made of tetrafluoroethylene polymer as disclosed in U. S. Patent 2,403,476 to Kenneth L. Berry et al., issued July 9, 1946. In any case, we provide means for substantially eliminating friction of the plastic against the walls of the die passage within which the flow of plastic is being measured, in order that the flow shall be essentially nonlaminar and the measuring element shall thereby indicate the true volumetric flow of the plastic.

It will be understood that various suitable conventional tachometer mechanisms may be substituted for the measuring wheels 30 and 64, and the speed measurements or indications obtained thereby may be used to synchronize any conventional cutting mechanism by means of any desired electrical, pneumatic or mechanical control system. In some cases it may even be sufficient for the speed measuring means to give visual indication of the linear speed of the plastic, the operation of the cutter being controlled manually in accordance with such visual indication.

Having thus described our invention, what we claim and desire to protect by Letters Patent is:

1. An apparatus for cutting a column of plastic in lengths of substantially uniform weight comprising means for forcing a column of plastic through a passageway, means for measuring any length of plastic which passes a cross-section of the passageway, and means operated in response to said measuring means for cutting the column of plastic into equal quantities determined by the length of the column measured within the said passageway between each operation of said cutting means.

2. In an extruding and cutting mechanism having means for synchronizing the operation of a cutter with the speed of extrusion of plastic material from an extruder tube having an extrusion orifice, the improvement of a speed measuring element located within the extruder tube and spaced from the said extrusion orifice for controlling the synchronizing means.

3. Apparatus for extruding plastic material and cutting same into lengths containing substantially equal quantities of material comprising a tube, means for forcing plastic material through said tube, means within said tube for measuring the rate of flow of the plastic material therein, means for cutting the extruded plastic material into lengths and means responsive to said measuring element for synchronizing the operation of said cutter with the rate of flow of the plastic.

4. Apparatus for extruding plastic material and cutting same into lengths containing substantially equal quantities of material comprising means for advancing the plastic material under pressure, a preliminary restricting die, an elongated confining chamber having a cross-sectional area greater than the area to which the plastic would ordinarily swell upon emerging freely from said restricting die, means for introducing a thin continuous film of liquid lubricant to the surface of the plastic within said chamber, a snubber at the exit of said elongated confining chamber, a measuring element for determining the speed of advancement of the plastic within said confining chamber, means for cutting the plastic into lengths after it emerges from the confining chamber, and control means for synchronizing said cutting means with the speed of the plastic within the confining chamber as determined by said measuring element.

5. An apparatus for extruding plastic material and cutting same into lengths containing substantially equal quantities of material comprising means for advancing the plastic material under pressure, a preliminary restricting die, an elongated confining chamber having a cross-sectional area greater than the area to which the plastic would ordinarily swell upon emerging freely from said restricting die, means for introducing a thin continuous film of liquid lubricant to the surface of the plastic in said chamber, a measuring wheel passing through the wall of said confining chamber engaging the plastic and rotatable by the forward movement thereof at a rate proportional to the flow of plastic, means associated with said measuring wheel for producing an electrical signal proportioned to the rate of rotation of said wheel, means for cutting the plastic into lengths after it emerges from the confining passage, and control means for regulating the operation of said cutter in accordance with the said electrical signal to cut off lengths of plastic corresponding to a definite volumetric flow within the confining chamber.

6. The method of extruding plastic material having elastic memory and cutting same into lengths containing substantially equal quantities of material comprising extruding the plastic through a tube, measuring the linear rate of flow of the plastic while the said plastic is confined within said tube, and cutting the plastic emerging from said tube into lengths corresponding to definite increments of said flow.

7. The method of extruding plastic material having elastic memory and cutting same into lengths containing substantially equal quantities of material comprising extruding the plastic through an elongated lubricated tube, measuring the linear rate of flow of the plastic while the said plastic is confined within said tube, and cutting the plastic after it emerges from said tube into lengths corresponding to definite increments of said flow.

8. The method of extruding plastic material having elastic memory and cutting same into lengths containing substantially equal quantities of material comprising extruding the plastic through a preliminary restricting die, causing the plastic to swell to a size greater than the size to which it would ordinarily swell upon emerging from the said restricting die, advancing and lubricating the plastic while confining it in said swollen size, measuring the linear rate of flow of the so confined plastic, and cutting the plastic after it emerges from confinement into lengths corresponding to definite increments of said flow.

THOMAS J. RHODES.
JAMES J. NEVILLE.

References Cited in the file of this patent

UNITED STATES PATENTS

| Number | Name | Date |
|---|---|---|
| 1,381,249 | Stewart | June 14, 1921 |
| 1,615,966 | Straight | Feb. 1, 1927 |
| 1,743,299 | Wiemer | Jan. 14, 1930 |
| 1,944,464 | Richardson | Jan. 23, 1934 |